United States Patent
Ligi, Jr. et al.

(10) Patent No.: US 10,279,722 B2
(45) Date of Patent: May 7, 2019

(54) CUP HOLDER MICRO-TENSIONER

(71) Applicant: Ford Global Technologies, LLC, Dearborn, MI (US)

(72) Inventors: Anthony Ligi, Jr., Chelsea, MI (US); Rosaria L. Petrella-Lovasik, Farmington Hills, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/674,245

(22) Filed: Aug. 10, 2017

(65) Prior Publication Data
US 2019/0047456 A1    Feb. 14, 2019

(51) Int. Cl.
*B60N 3/00* (2006.01)
*B60N 3/10* (2006.01)

(52) U.S. Cl.
CPC .............. *B60N 3/106* (2013.01); *B60N 3/101* (2013.01)

(58) Field of Classification Search
CPC ........... B60N 3/108; B60N 3/10; B60N 3/102
USPC ................ 248/311.2, 313, 309.1, 316.1
See application file for complete search history.

(56) References Cited

U.S. PATENT DOCUMENTS

| | | | |
|---|---|---|---|
| 5,149,032 A | 9/1992 | Jones et al. | |
| 5,167,392 A | 12/1992 | Henricksen | |
| 5,560,578 A | 10/1996 | Schenken et al. | |
| 6,637,709 B1 | 10/2003 | Guenther et al. | |
| 7,380,762 B2 * | 6/2008 | Takeichi ................ | B60N 3/106 248/309.1 |
| 7,487,945 B2 * | 2/2009 | Liu ......................... | B60N 3/106 224/926 |
| 7,520,482 B2 * | 4/2009 | Shin ....................... | B60N 3/106 224/926 |
| 7,866,620 B2 * | 1/2011 | Kaemmer .............. | B60N 3/106 224/282 |
| 8,360,380 B2 * | 1/2013 | Soma ..................... | B60N 3/101 224/926 |
| 8,733,724 B2 * | 5/2014 | Voigt ..................... | B60N 3/101 220/703 |
| 9,004,332 B2 * | 4/2015 | Kodama ................. | B60N 3/10 220/737 |
| 9,561,745 B2 * | 2/2017 | Sawada .................. | B60N 3/10 |
| 9,796,317 B2 * | 10/2017 | Neumann ............ | E05D 15/0604 |

* cited by examiner

*Primary Examiner* — Steven M Marsh
(74) *Attorney, Agent, or Firm* — Vichit Chea; Brooks Kushman, P.C.

(57) ABSTRACT

A vehicle beverage receptacle may include a beverage receptacle including a plurality of fingers protruding radially inwardly into the receptacle to maintain a beverage container within the receptacle, a band arranged around an outer perimeter of the receptacle and engaging a backside of the fingers to apply a radially inward force at the fingers, and a tension adjustment mechanism configured to adjust the tension of the band and adjust the force applied at the fingers.

16 Claims, 7 Drawing Sheets

CUP HOLDER MICRO-TENSIONER

TECHNICAL FIELD

This disclosure relates to cup holder micro tensioners.

BACKGROUND

Vehicles often include any number of cup holders or beverage holders to secure a drink therein. The cup holders secure the drink by providing stabilization to the beverage container to prevent the beverage container from moving during transit. Such cup holders may attempt to stabilize beverage containers of varying sizes. For example, a cup holder may attempt to accommodate both a juice box and a large metal coffee canister. In some instances, the cup holder may be adjustable in an effort to accommodate the varying sizes of beverage holders.

SUMMARY

A vehicle beverage receptacle may include a beverage receptacle including a plurality of fingers protruding radially inwardly into the receptacle to maintain a beverage container within the receptacle, a band arranged around an outer perimeter of the receptacle and engaging a backside of the fingers to apply a radially inward force at the fingers, and a tension adjustment mechanism configured to adjust the tension of the band and adjust the force applied at the fingers.

A vehicle beverage assembly may include a pair of beverage receptacles, each including a plurality of fingers protruding radially inwardly into the receptacle to maintain a beverage container within the receptacle, a band arranged around an outer perimeter of at least one of the receptacles and engaging a backside of the fingers to apply a radially inward force at the fingers, and a tension adjustment mechanism configured to adjust the tension of the band thus adjusting the force applied at the fingers.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a beverage holder assembly having at least one receptacle configured to receive a beverage container. The receptacle may include a plurality of fingers extending radially inward to engage the beverage container and further stabilize the same. The force applied to the beverage container may be adjusted by adjusting a tension of a band arranged behind the receptacle. By increasing the tension of the band, the fingers may be forced inward and maintain their position against the receptacle more so than if the fingers were under a lesser tension. The tension of the fingers may be adjusted by a manually winding of the band, or a motorized mechanism, in response to user input at a user interface.

Figure 1:
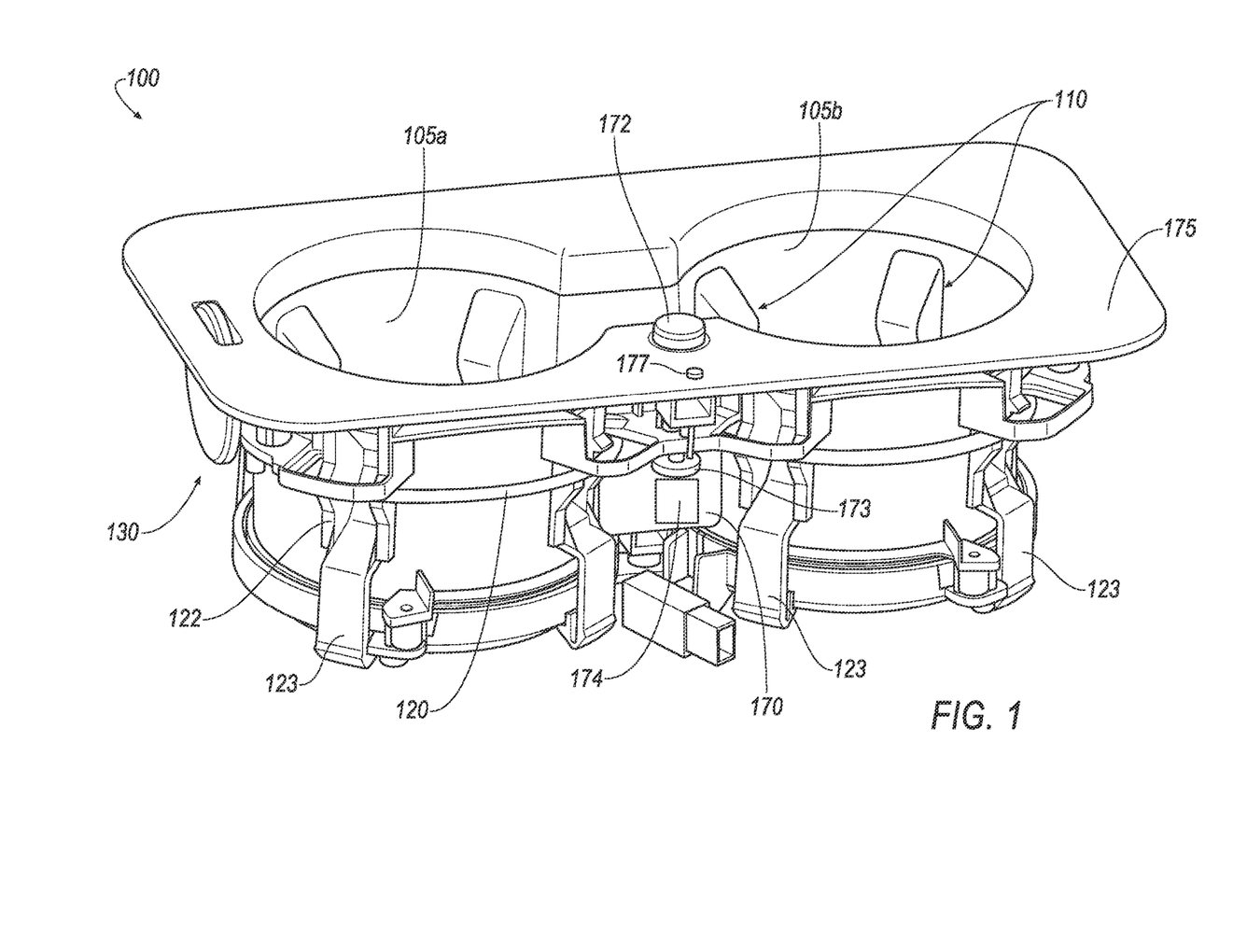
FIG. 1 illustrates an example perspective view of a beverage holder assembly.

FIG. 1 illustrates an example perspective view of a beverage holder assembly 100. The beverage holder assembly 100 includes at least one beverage receptacle 105. In the example shown in FIG. 1, the assembly 100 includes two beverage receptacles, individually labeled as first beverage receptacle 105a and second beverage receptacle 105b. Each receptacle 105 may form a cylindrical shape configured to receive a beverage container and maintain the beverage container therein. The beverage container may include a can such as a soda or pop can, a to-go container such as a hot beverage container, a fast food beverage cup, etc.

The receptacle 105 may include a plurality of fingers 110 configured to protrude inward towards the center of the receptacle 105. In the example shown in FIG. 1, each receptacle 105 includes four fingers 110, though more or less could be included. The fingers 110 may be configured to protrude inward of the receptacle 105 and engage the beverage container and maintain the beverage container in a fixed, but removable, position within the receptacle 105.

A band 120 may be arranged around an outer perimeter 112 of the receptacle 105. The band 120 may have elastic properties in which the band may stretch and retract according to force applied thereto. The band 120 may engage a backside 122 of the fingers 110, causing the fingers 110 to be forced inward towards the center of the receptacle 105. The backside 122 of the fingers 110 may form a band notch 124 configured to receive and maintain the band 120 on the backside 122 of the fingers 110. The band notch 124 may aid in maintaining the band 120 therein, preventing the band 120 from slipping or moving from the backside 122 of the fingers 110.

The band 120 may allow the force or tension of the fingers 110 to be flexible. Upon inserting a beverage container into the receptacle 105, the fingers 110 may engage the beverage container and be pushed into the receptacle such that the backside 122 of the fingers 110 move radially outwardly from the outer perimeter 112 of the receptacle 105. Conversely, while the beverage container may force the fingers 110 toward the receptacle 105, the band 120 may apply an opposing force to the fingers 110, pushing the fingers 110 inward. The fingers 110 may therefor engage the beverage container with enough force to maintain the beverage container within the receptacle 105 to prevent slipping or tipping of the beverage container. If the beverage container is removed from the receptacle 105, the fingers 110 may return to a normal resting state.

Not all beverage containers are of the same diameter and often times receptacles are not sized appropriately for a certain container, causing the container to slip, tip, or not fit within the receptacle at all. The fingers 110 allow for the receptacle 105 to accommodate and effectively maintain various sizes of beverage containers. By allowing for an adjustable tension of the fingers 110, various beverage containers may be secured within the receptacle 105. Each finger 110 may be pivotable at a hinge 123, allowing the fingers 110 to move inward and outward with respect to the receptacle.

To accommodate the adjustable tension, the holder assembly 100 may include a tension mechanism configured to adjust the tension of the band 120. The tension mechanism may include an interface that is accessible to the user/passenger such that the passenger may adjust the tension of the band 120, either by increasing or decreasing the tension. In the examples shown herein, the interface may include a button and/or a wheel. By increasing or decreasing the tension of the band 120, the inward force applied by the fingers 110 on a beverage container within the receptacle 105 may also be adjusted. Thus, the adjustable tension of the band 120 allows for a selectable force to be applied to beverage containers, allowing for various sizes of beverage containers to be accommodated.

Figure 2:
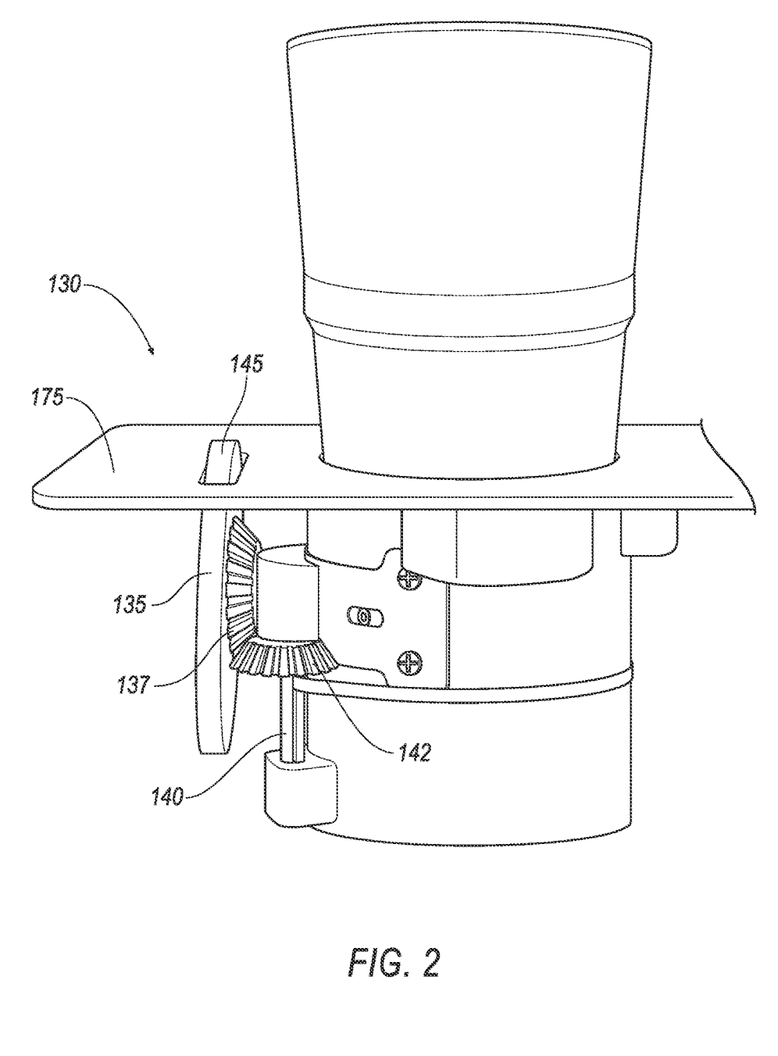
FIG. 2 illustrates a side view of the receptacle of FIG. 1 illustrating a tension mechanism, including a wheel.

In one example, the tension mechanism may include a manual tension mechanism 130. The manual tension mechanism 130 may include a wheel 135, where at least a portion of which is accessible to the user. Referring to FIG. 2, the wheel 135 may be operably connected to at least one first gear 137 arranged substantially parallel to the outer perimeter 112 of the receptacle 105. A spindle 140 (or shaft) may also extend substantially parallel to the outer perimeter 112 of the receptacle 105. The spindle 140 may be configured to receive at least a portion of the band 120 whereby the band 120 may be wound and unwound around the spindle 140. A second gear 142 may be arranged at the spindle 140 and may engage with the first gear. The second gear 142 is shown as being arranged at a top of the spindle 140, though other placements of the second gear 142 along the spindle 140 may be appreciated. The first gear 137 and second gear 142 may be bevel gears and/or may include interlocking tooth-bearing faces. The gears 137, 142 may be bevel shaped and be mounted in a 90 degree relationship with one another.

As a user rotates the wheel 135 with his or her finger at an exposed portion 145, the first gear 137 may rotate, causing the second gear to rotate 142. The spindle 140 may in turn rotate either clockwise or counterclockwise, depending on the direction of the rotation at the exposed portion 145. In one example, where the spindle is turning clockwise, the band 120 may be wound around the spindle 140. In another example, where the spindle 140 is turning counter clockwise, the band 120 may be un-wound, or released from the spindle 140. In the event that the band 120 is wound around the spindle 140, the tension of the band 120 at the backside 122 of the fingers 110 may increase. In the reversed direction, or counterclockwise, the tension may decrease. Thus, the user, by actuating the wheel 135, may manually adjust the tension at the fingers 110 in an effort to form a better, or more appropriate, grip on the beverage container arranged within the receptacle 105.

To reiterate, as the band 120 is wound around the spindle 140, the tension of the band 120 increases, causing the fingers to protrude inward into the center of the receptacle. As the band 120 is unwound around the spindle 140, the tension of the band 120 decreases, causing the fingers to retract outward from the center of the receptacle.

Figure 3:
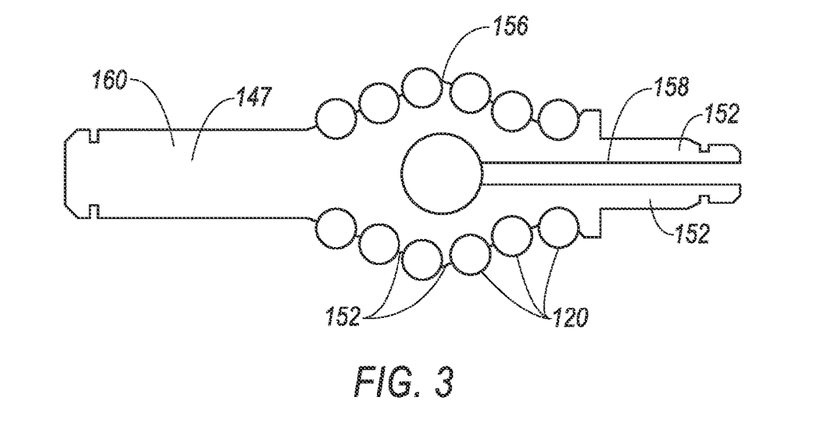
FIG. 3 illustrates a side view of another example of the manual tension mechanism.

FIG. 3 illustrates a side view of another example of the manual tension mechanism 130. In this example, a fork-like shaft 147 (also referred to herein as "fork 147"), may extend from the wheel 135. The fork-like shaft 147 may include a pair of tongs 152. Each tong 152 may include a plurality of grooves configured to receive portions of the band 120. The wheel 135 may cause the shaft 147 to rotate. When the shaft 147 rotates clockwise, the band 120 may wind around the shaft 147 such that the grooves 154 may receive the band 120.

The fork-like shaft 147 may include a concave portion 156 arranged between a distal end 158 and a proximal end 160. The grooves 154 may be arranged around the concave portion 156. By winding the band 120 around the concave portion 156, the fork 147 may create a non-uniform or non-linear tension adjustment. That is, as the wheel 135 turns, the amount of tension applied or released at the band 120 may not be uniform per degree of turn at the wheel 135. As the band 120 is wound around and placed in the grooves 154 near the distal end 158 of the fork 147, the tension may be increased at a slower rate than when the band is wound around the concave portion 156. This is due to the fact that the radius is larger at the concave portion 156, thus displacing more of the band 120 and stretching the band 120 more than when the band 120 is wound around the smaller radius portions at the ends 158, 160.

Figure 4:
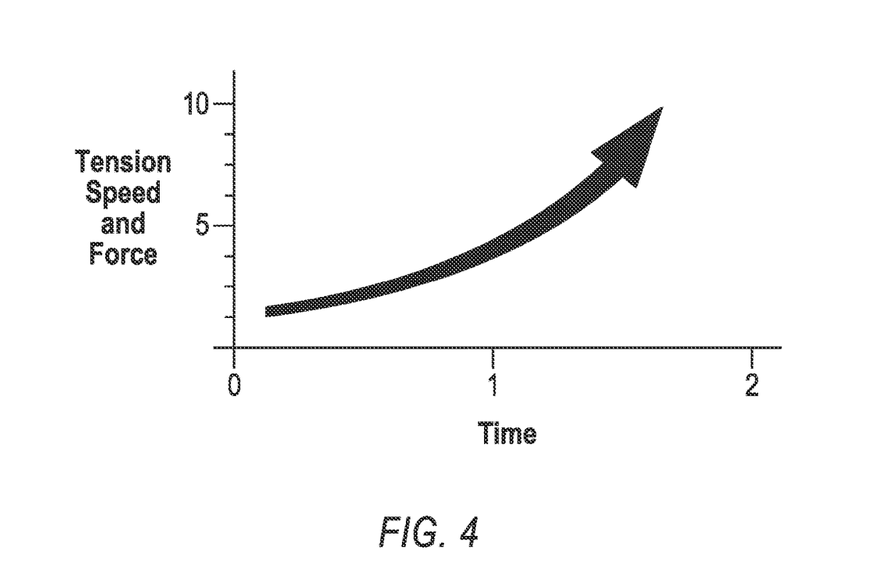
FIG. 4 illustrates an example chart showing tension increasing with time when the wheel is turned clockwise.

FIG. 4 illustrates an example chart showing that the tension increases with time when the wheel is turned clockwise. The converse would also be true in the event that the wheel was turned counterclockwise to release the tension.

Referring back to FIG. 1, in addition to or in alternative to the manual tension mechanism 130, the holder assembly 100 may include a motorized tension mechanism 170. The motorized tension mechanism 170 may include a button 172 arranged on a surface 175 of the holder assembly 100. The button 172 is configured to start and stop a motor 174. The motor 174 may be configured to wind the band 120 in order to increase the tension at the fingers 110. Tension may be released by depressing and nearly immediately reversing the button. Tension may also be released by a mechanical ratchet 173. The mechanical ratchet 173 may include a gear and pawl (not specifically shown). When the motor 174 winds the band 120 to increase the tension at the fingers 110, the pawl may engage the gear and maintain the set tension. Upon release via an actuation of a release button 175, the pawl may release the gear and allow the band 120 to unwind.

The motor 174 may be an electric motor configured to be powered by electric power from the vehicle, such as the vehicle battery (not shown). The motor 174 may be a DC motor, including magnetic, brushless, etc.

Figure 5:
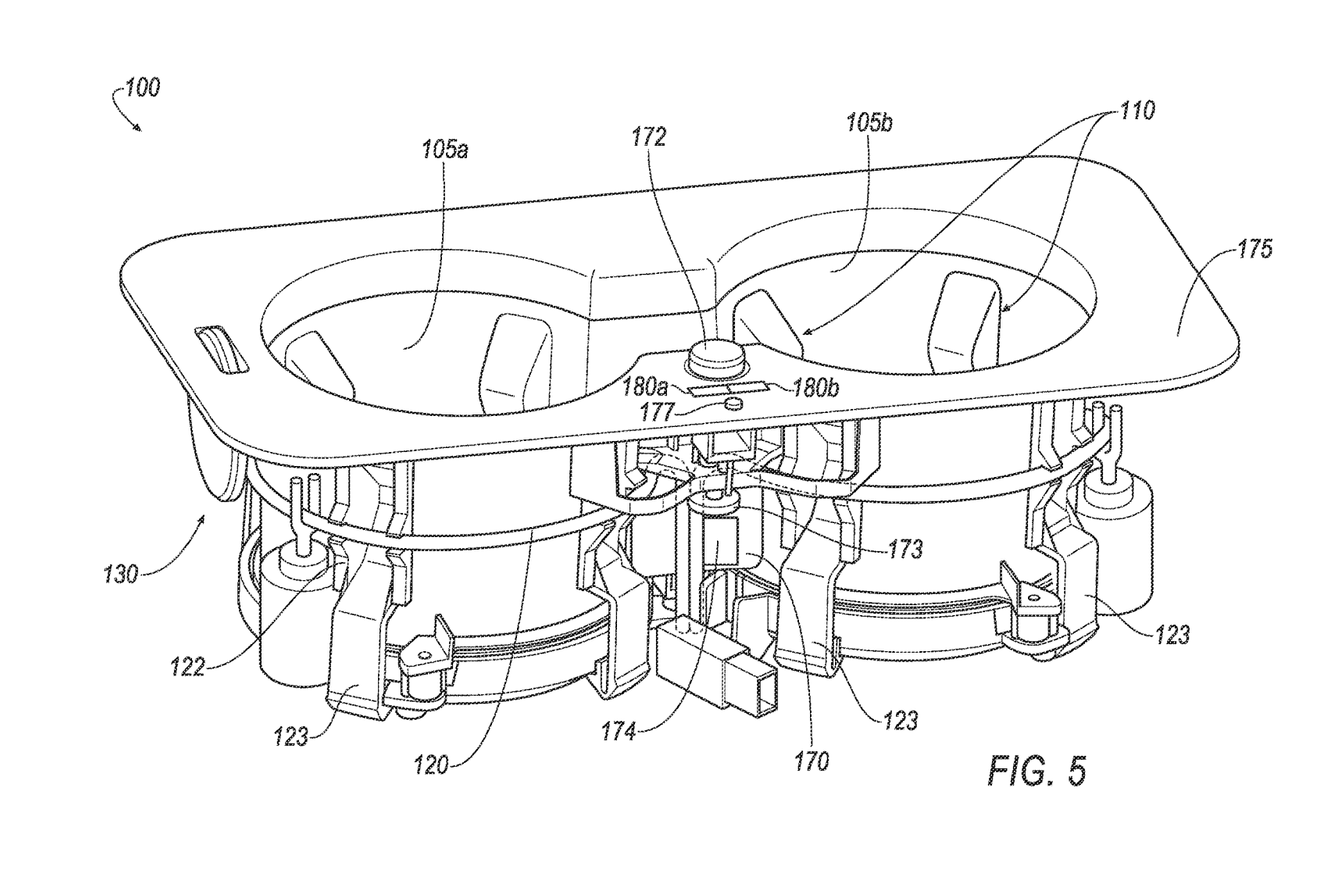
FIG. 5 illustrates another example perspective view of a beverage holder assembly having a tension mechanism including a wheel.

Referring to FIG. 5, the holder assembly 100 may include a pair of motorized tension mechanism 170, one for each receptacle. The left tension mechanism 170a may control the tension of the left receptacle 105a. The left tension mechanism 170b may control the tension of the left receptacle 105b. A switch 177 may be arranged on the surface 175. The switch 177 may include two tabs 180a, 180b, one tab 180a configured to control the left motor 170a, and one tab 180b configured to control the right motor 170b. Similar to the button 172 in FIG. 1, depressing the switch 177 at one tab 180 may wind that respective band 120 in order to increase the tension at the fingers 110. Tension may be released by depressing and nearly immediately releasing the tab 180. Thus, depressing the switch 177 at the tab on the first or left side may start the left motor 170a, while depressing the switch 177 on the right side may start the right motor 170*b*. The tension may also be released by depressing the release button 175, as described above.

By having two separate motorized tension mechanisms 170 configured to control two separate finger tensions with two separate bands 120 (i.e. left band 120*a* and right band 120*b*), each receptacle 105 may be customized to a specific size of beverage container. More so, two containers that differ in size may be concurrently maintained within the separate receptacles 105*a*, 105*b*.

The motor 174 may be connected to a fork similar to fork 147. As explained above, the fork 147 may be configured to adjust the tension at a non-uniform rate.

Figure 6:
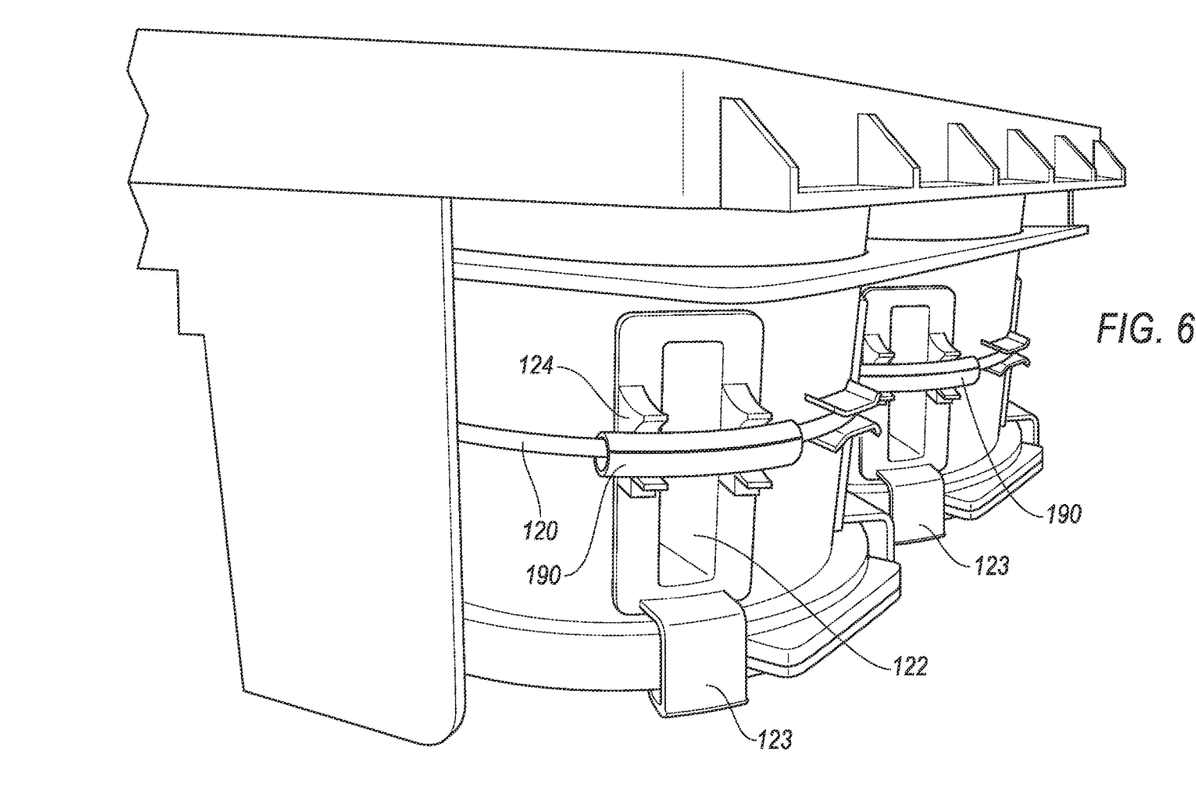
FIG. 6 illustrates an example embodiment of the outer perimeter of the receptacle.

FIG. 6 illustrates an example embodiment of the outer perimeter 112 of the receptacle 105. As explained above with respect to FIG. 1, the backside 122 of the fingers may include a finger notch 124 configured to receive and maintain the band 120. During operation, the band 120 may be continually moving through the notch 124. This may create wear and tear on the band 120 that may affect the band's elastic ability. For example, continuous friction between the band 120 and the notch 124 may create worn portions of the band where the band may start to fray or tear. To mitigate or eliminate this affect, the finger notch 124 may be configured to receive a sheath 190 configured to protect the band 120 from such wear and tear. The sheath 190 may be made from a material having lubricity.

The sheath 190 may include a smooth and non-abrasive surface that allows the band 120 to easily move across or within. In the example shown in FIG. 6, the sheath 190 may be in the form of a tube. The tube may form a rounded cavity or a "macaroni" shaped tube configured to receive the band 120. The sheath 190 may fit within the notch 124 and the band 120 may fit within the sheath 190. The sheath 190 may create a less abrupt surface than that created by the notch 124 to further guide and protect the band 120. Although not shown, lubricant such as oil, may be arranged within the sheath 190 to further aid the movability and lateral movement of the band 120 therein.

In addition to preventing wear and tear on the band 120, the sheath 190 also allows the band 120 to create uniform tension at each of the fingers 110. That is, as one finger is adjusted, so are the rest, uniformly. When friction is created at the band 120, certain portions of the band 120 may 'stick', creating the tension at one FIG. 110 to be adjusted, while another's may lag. By allowing fluid movement of the band 120, the sheath 190 may decrease or all together prevent such non-uniformity caused by friction at the band 120.

Figure 7:
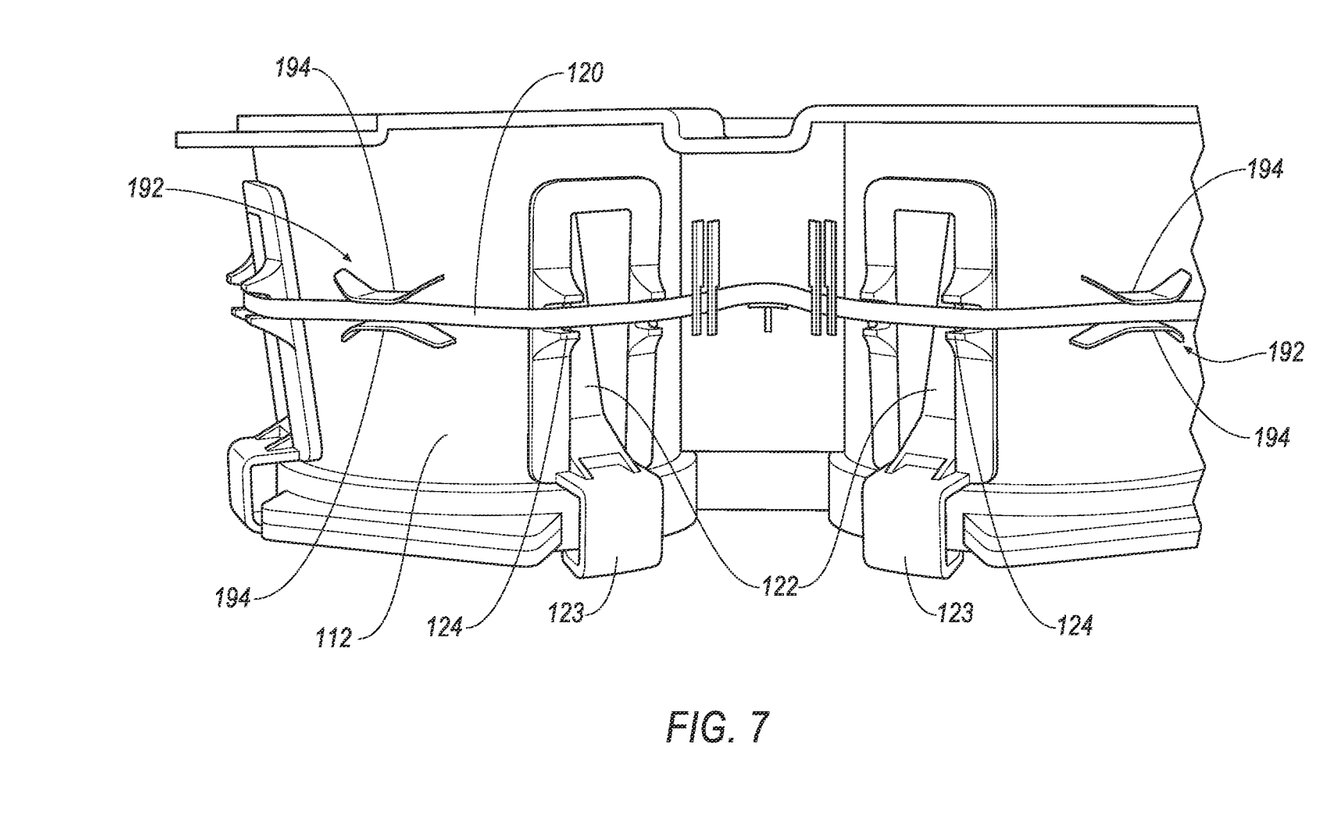
FIG. 7 illustrates another example embodiment of the outer perimeter of the receptacle.

FIG. 7 illustrates another example embodiment of the outer perimeter 112 of the receptacle 105. In this example, the outer perimeter 112 includes at least one guide 192 configured to further receive and guide the band 120. The guide 192 may include two rails 194 configured to create a channel to receive the band 120. The guide 192 may be arranged between at least one pair of fingers 114 to further maintain the band 120 at a fixed position around the receptacle 105. The guide 192 may be arranged between each finger 114, or only a portion of the fingers 114. Lubricant such as oil may be arranged at the guide 192 to further aid lateral movement of the band 120 within the guide.

Although not shown in FIG. 7, the sheath 190 of FIG. 6 may also be included at the finger notch 124. Additionally or alternatively, a sheath may also be arranged within the guide 192.

Figure 8:
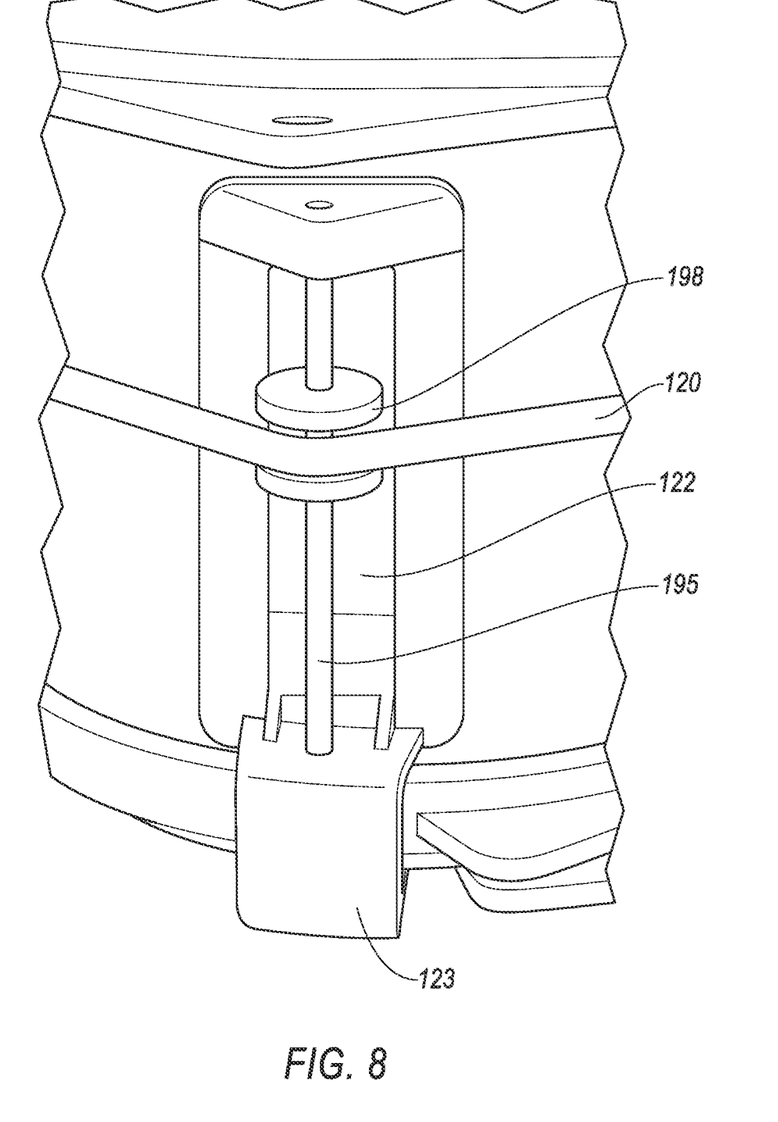
FIG. 8 illustrates another example embodiment of the outer perimeter of the receptacle.

FIG. 8 illustrates another example embodiment of the outer perimeter 112 of the receptacle 105. In this example, the finger notch 124 includes a pulley-like retention mechanism 198. The retention mechanism 198 may include a vertical bar 195 arranged within the backside 122 of the finger 110. The bar 195 may extend the length of the finger 110 and may move with the finger 110 via the hinge 123. A pulley 198 may be arranged on the bar 195 and may be configured to rotate about the bar 195. The pulley 198 may define a groove configured to retain the band 120 therein. As the band 120 is tightened by one of the tension mechanisms, the band 120 may cause the pulley 198 and bar 195 to move inward, thus causing the finger 110 to move radially inward. As the tension of the band 120 is released, the pulley 198 and bar 195 may relax, allowing the finger 110 to retract from the receptacle 105.

The pulley 198 may be arranged at a fixed location along the bar 195 while still being rotatable about the bar 195. Alternatively, the pulley 198 may move vertically as well as rotationally with respect to the bar 195. retention mechanism 198 may retain the band 120 while allowing the band to move freely within the groove of the pulley 198, decreasing friction that may otherwise be created by the notch 124 illustrated in previous figures. In addition to decreasing wear and tear on the band 120, the retention mechanism 198, similar to the sheath 190, may allow for uniform application of the tension adjustments.

Accordingly, a beverage container receptacle system is disclosed herein. The receptacle may include a plurality of fingers having an adjustable tension. The adjustable tension may be provided by a band surrounding a rear of the fingers behind a beverage receptacle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle beverage receptacle, comprising:
   a beverage receptacle including a plurality of fingers protruding radially inwardly into the receptacle to maintain a beverage container within the receptacle;
   a band arranged around an outer perimeter of the receptacle and engaging a backside of the fingers to apply a radially inward force at the fingers; and
   a tension adjustment mechanism including a wheel at least partially exposed at a surface of the receptacle, the wheel configured to receive user input to adjust the tension of the band and adjust the force applied at the fingers.

2. The receptacle of claim 1, wherein the tension mechanism includes a shaft configured to receive a portion of the band, the band configured to wind around the shaft wherein the tension of the band in increased as the band is wound around the shaft and wherein the tension is decreased as the band is unwound from the shaft.

3. The receptacle of claim 2, wherein the tension mechanism includes at least one gear operably connected to the wheel and configured to rotate the shaft based on an actuation at the wheel.

4. The receptacle of claim 1, wherein a user interface of the tension adjustment mechanism is a button at a surface of the receptacle.

5. The receptacle of claim 3, wherein the tension mechanism includes a motor configured to rotate the shaft in response to an actuation at the wheel.

6. The receptacle of claim 1, wherein the backside of the fingers defines at least one notch configured to maintain the band therein.

7. The receptacle of claim 1, further comprising at least one guide arranged on the outer perimeter of the receptacle between two of the fingers in order to further maintain the band on the outer perimeter.

8. The receptacle of claim 1, further comprising a tube configured to receive at least a portion of the band to protect the band from stress created at the backside of the fingers.

9. A vehicle beverage assembly, comprising:
- a pair of beverage receptacles, each including a plurality of fingers protruding radially inwardly into the receptacle to maintain a beverage container within the receptacle;
- a band arranged around an outer perimeter of at least one of the receptacles and engaging a backside of the fingers to apply a radially inward force at the fingers; and
- a tension adjustment mechanism including a user interface and a shaft connected to a motor, the shaft configured to receive a portion of the band, and the motor configured to rotate the shaft in response to actuation at the user interface to wind and unwind the band therearound to adjust the tension of the band.

10. The assembly of claim 9, wherein the band includes a pair of bands, each arranged around the outer perimeter of one of the receptacles.

11. The assembly of claim 10, wherein the tension mechanism includes a pair of tension mechanisms, each associated with one of the bands and configured to adjust the tension of that respective band independent of the other band.

12. The assembly of claim 9, wherein the band is configured to wind around the shaft wherein the tension of the band in increased as the band is wound around the shaft and wherein the tension is decreased as the band is unwound from the shaft.

13. The assembly of claim 9, wherein the user interface is a wheel at least partially exposed as a surface of the receptacle.

14. The assembly of claim 9, wherein the user interface is a button at a surface of the receptacle.

15. The assembly of claim 9, wherein the backside of the fingers defines at least one notch configured to maintain the band therein.

16. A vehicle beverage receptacle, comprising:
- a beverage receptacle including a plurality of fingers protruding radially inwardly into the receptacle to maintain a container therein; a band arranged around an outer perimeter of the receptacle and engaging a backside of the fingers to apply a radially inward force at the fingers; and
- a tube configured to receive a portion of the band to protect the band from stress created at the backside of the fingers.

* * * * *